United States Patent Office 3,634,362
Patented Jan. 11, 1972

3,634,362
PROCESS FOR THE MANUFACTURE OF POLYOXAMIDES IN THE PRESENCE OF A GLYCOL
Joseph Oldham, Manchester, England, assignor to Imperial Chemical Industries Limited, London, England
No Drawing. Filed Feb. 2, 1970, Ser. No. 8,082
Claims priority, application Great Britain, Feb. 19, 1969, 8,937/69; Mar. 18, 1969, 14,109/69; Sept. 15, 1969, 45,292/69
Int. Cl. C08g 20/00
U.S. Cl. 260—78 R        2 Claims

ABSTRACT OF THE DISCLOSURE

Improved process for the manufacture of high molecular polyoxamides and copolyoxamides by condensing together at least one diamine and an oxalic acid di-alkyl ester in the presence of a glycol of the formula:

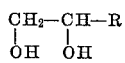

wherein R is hydrogen, lower alkyl or hydroxymethyl, and the use of the said polymers for the production of filaments, fibres, molded or shaped articles or as coatings for metal articles.

---

This invention relates to an improved process for manufacture of polyamides and more particularly to an improved process for the manufacture of polyoxamides capable of being melt spun into filaments.

Although it is well known to manufacture polyoxamides by condensing together diamines and oxalic acid or an ester thereof, it has proved to be difficult to obtain polymers of a sufficiently high molecular weight to be capable of being melt spun into filaments. Thus whilst the molecular weight of low molecular weight polyoxamides can be increased by heating such polymers on their own at temperatures above 150° C., decarboxylation increasingly occurs as the temperature is raised, so that the decarboxylation portions of the polymer are no longer able to further condense thus resulting in a limitation in the ultimate length of the polymer chains.

It is also known to effect the condensation in the presence of compounds containing one or more hydroxy groups, including aliphatic glycols such as 1:4-butanediol and 1:6-hexanediol, but it has not proved possible to obtain polyoxamides of a sufficiently high molecular weight for conversion to filaments and fibres having satisfactory properties. In this connection it is stated that high boiling alcohols, glycols etc., react chemically with polyamides at temperatures above 150° C. to produce products differing in kind from the parent polyamides. It was therefore considered that the use of glycols was disadvantageous due to interaction of the glycol with the polyoxamide.

It has now been found that polyoxamides of sufficiently high molecular weight for the production of filaments and fibres can be readily obtained by carrying out the condensation of the diamine and the oxalic acid ester in the presence of ethylene glycol or of certain substituted derivatives thereof, and surprisingly it is found that the glycol does not interact with the polyoxamide.

According to the present invention there is provided an improved process for the manufacture of high molecular polyoxamides and copolyoxamides which comprises condensing together at least one diamine and an oxalic acid di-alkyl ester in the presence of a glycol of the formula:

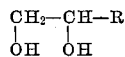

wherein R is a hydrogen atom or a lower alkyl or hydroxymethyl radical.

The process of the invention can be conveniently carried out by adding the diamine, or mixture of diamines, and the oxalic acid ester to the glycol, and, after any initial reaction has taken place, heating the mixture to a temperature above 140° C. preferably to a temperature between 150° C. and 170° C., until the required degree of polymerisation is obtained. During the heating the alcohol obtained by reaction of the oxalic ester and the diamine is distilled off from the reaction mixture. The polyoxamide is then isolated by filtration, washed with a liquid such as water or methanol to remove the glycol, and the polyoxamide then dried.

If desired the process can be carried out in the presence of a compound which is known to function as an ester-interchange catalyst, in particular zinc oxide or lead monoxide.

Alternatively the process of the invention can be carried out by heating the diamine and the oxalic acid ester together in a hydrocarbon solvent, such as xylene, isolating the prepolymer which is formed and subsequently heating this in the glycol to form the polyoxamide.

The reaction is preferably carried out in an inert atmosphere such as nitrogen.

Throughout the specification the term "lower alkyl" is used to denote alkyl radicals having from 1 to 4 carbon atoms.

As examples of the lower alkyl radicals represented by R there may be mentioned methyl, ethyl, n-propyl, iso-propyl and preferably n-butyl.

The diamines used in the process of the invention are cyclic diamines, or preferably aliphatic diamines containing from 2 to 12 carbon atoms, or diamines of the formula:

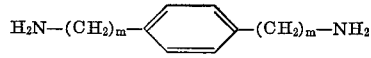

wherein m is an integer of from 1 to 3.

As specific examples of diamines which can be used in the process there may be mentioned ethylene diamine, trimethylenediamine, 1:2-propylenediamine, tetramethylenediamine, pentamethylenediamine, hexamethylenediamine, 3-methyl hexamethylenediamine, 2:5-dimethyl hexamethylenediamine, mixtures of 2:2:4- and 2:4:4-trimethylhexamethylenediamine, 3:3:5-trimethyl-5-aminomethyl-cyclohexylamine, octamethylenediamine, decamethylenediamine and dodecamethylene diamine.

The oxalic acid esters used in the process of the invention are preferably lower alkyl esters such as dimethyl oxalate, diethyloxalate, di-iso-propyl oxalate and di-n-butyl oxalate.

The quantity of the glycol which is used in the process is not critical, but it is preferred to use between 10% and 100% by weight of the glycol based on the total weight of the diamine and the oxalic acid ester. As specific examples of glycols which can be used in the process there may be mentioned glycerol, 1:2-propane diol, 1:2-butane-diol and preferably ethylene glycol.

If desired the polymerization can additionally be carried out in the presence of delustrants such as titanium dioxide, pigments such as carbon black or copper phthalocyanine, heat stabilisers, light stabilisers, antioxidants or molecular weight regulators.

The polymerization is carried out until the polyoxamide has an inherent viscosity of at least 0.75 when determined in m-cresol (the inherent viscosity being directly related to the molecular weight of the polyoxamide), and preferably to an inherent viscosity of at least 0.9.

The polyoxamides obtained by the process of the invention can be subsequently converted into filaments and fibres by melt spinning, and/or extruded into the form of molded and shaped articles.

The polyoxamides are also of value as coatings for metal articles, as they form coatings on the metal having a high degree of adhesion, and a high degree of resistance to corrosion is conferred on the metal. Such coatings can be obtained, for example, by briefly immersing the heated metal article in a fluidised bed of the polyoxamides in finely divided form.

If desired the polyoxamides can be subjected to a heat treatment, preferably at above the melting part of the polymer before being used for this purpose.

The invention is illustrated but not limited by the following examples in which the parts and percentages unless otherwise stated, are by weight.

The inherent viscosities given in the examples were calculated from the relative viscosities using the formula Inh. viscosity 2×ln (relative viscosity). The relative viscosities were determined using a 0.5% solution of the polyoxamide in m-cresol unless some other solvent is stipulated.

EXAMPLE 1

13.65 parts of a mixture of 2:2:4-trimethyl hexamethylenediamine, 2:4:4-trimethyl hexamethylenediamine and hexamethylenediamine in the molar proportions 60:40:82, are added with stirring to a suspension of 19.733 parts of di-n-butyloxalate in 100 parts (by volume) of ethylene glycol which is maintained under an atmosphere of nitrogen. The temperature of the reaction mixture rises spontaneously to 44° C. with formation of a solid. The mixture is then heated to 160° C. the butanol formed in the reaction being removed by distillation, and the mixture is then stirred for 2 hours at 160° C. The mixture is then cooled, and the precipitated polyoxamide is filtered off, washed with water and dried.

The polyoxamide has an inherent viscosity of 1.15, an amine end group content (AEG) of 31.8 microequivalents per gram, and a carboxylic acid ester group content (C.E.G.) of 58.0 microequivalents per gram.

When the 100 parts of ethylene glycol used in the above example are replaced by equal volumes of propane 1:2-diol or glycerol, polyoxamides having inherent viscosities of 0.77 and 076 respectively are obtained.

In a series of comparative experiments the 100 parts of ethylene glycol used in the above example were replaced by the parts (by volume) of the solvents listed in the first column of the following table, the inherent viscosities of the resulting polyoxamides being listed in the corresponding line of the second column of the table.

| Solvent | Inherent viscosity |
| --- | --- |
| Mixture of 50 parts of m-cresol and 70 parts of xylene | 0.51 |
| 100 parts of N:N-dimethyl formamide | 0.42 |
| 100 parts of benzyl alcohol | 0.47 |
| 100 parts of n-butanol (reaction temperature of 117° C. used) | 0.58 |
| Mixture of 80 parts of xylene and 40 parts of n-butanol | 0.46 |
| 100 parts of cyclohexanol | 0.47 |
| 100 parts of n-butane-1:4-diol | 0.61 |
| 100 parts of propane-1:3-diol | 0.72 |
| 100 parts of n-butane-2:3-diol | 0.53 |

EXAMPLE 2

A solution of 465.4 parts of the diamine mixture as defined in Example 1 in 1250 parts of xylene, 23 parts of a 10% suspension of titanium dioxide in xylene, and 676.6 parts of di-n-butyl oxalate in 1250 parts of xylene are mixed together and then stirred at the boil under a reflux condenser for 1 hour. The mixture is cooled to 20° C., and the polyoxamide of inherent viscosity 0.38 is filtered off and dried. The A.E.G. of the polyoxamide is 173 and the C.E.G. is 228 units.

A mixture of 20 parts of this polyoxamide and 120 parts by volume of ethylene glycol is stirred for 2 hours at 160° C The mixture is then cooled, and the precipitated polyoxamide is filtered off and dried. The inherent viscosity of the resulting polyoxamide was 1.056, and the A.E.G. and C.E.G. values were respectively 22.4 and 20.0.

When the polyoxamide of inherent viscosity 0.38 was heated for 1 hour at 275° C. in an atmosphere of nitrogen, 60 microequivalents of carbon dioxide were evolved per gram of polymer, so that although the resulting polymer had an inherent viscosity of 0.87 it also contained at least 60 microequivalents of inert end groups per gram of polymer.

EXAMPLE 3

A mixture of 15.046 parts of hexamethylenediamine, 26.11 parts of di-n-butyl oxalate and 150 parts of ethylene glycol is heated to 160° C. under an atmosphere of nitrogen, the n-butanol formed being removed by distillation. The mixture is then heated for 2 hours at 160° C. followed by 1 hour at 186° C. under an atmosphere of nitrogen.

The resulting polyoxamide had an inherent viscosity of 0.86 (based on a determination of the relative viscosity of a concentrated sulphuric acid solution), a melting by differential thermal analysis of 331° C., and a glass transition temperature of 158° C.

When the above quantities of hexamethylene diamine and di-n-butyl oxalate were heated together for 5 hours at 224° C. in a medium of liquid paraffin, a polyoxamide having an inherent viscosity of only 0.26 was obtained.

EXAMPLE 4

A mixture of 14.888 parts of a mixture of 2:2:4-trimethylhexamethylenediamine, 2:4:4 - trimethylhexamethylenediamine and hexamethylenediamine in the molar ratio 60:40:150, 22.56 parts of di-n-butyl oxalate and 150 parts of ethylene glycol is heated under the conditions specified in Example 3.

The resulting polyoxamide has an inherent viscosity of 1.002 (sulphuric acid), and a melting point and a glass transition temperature of 280° C. and 87° C. respectively.

In place of the 14.888 parts of the above mixture of diamines there are used 12.559 parts of a mixture of 2:2:4-trimethylhexamethylene diamine, 2:4:4 - trimethylhexamethylene diamine and hexamethylenediamine in the molar ratio of 60:40:233, whereby a polyoxamide of inherent viscosity 0.91 (sulphuric acid) is obtained. The melting point and glass transition temperature are 293° C. and 90° C. respectively.

EXAMPLE 5

The procedure of Example 1 is repeated except that the reaction is carried out for the time and at the temperatures stated in the first two columns of the table. The properties of the resulting polyoxamides are listed in the last three columns of the table.

| Time (hours) | Temperature (° C.) | Inherent viscosity | A.E.G. | C.E.G. |
| --- | --- | --- | --- | --- |
| 0.5 | 160 | 0.87 | 66.9 | 62.5 |
| 4.0 | 160 | 1.28 | 29.0 | 35.9 |
| 7.5 | 160 | 1.49 | 21.5 | 30.0 |
| 2.0 | 140 | 0.88 | 63.8 | 73.4 |

EXAMPLE 6

A mxiture of 13.76 parts of a mixture of 2:2:4-trimethylhexamethylenediamine and hexamethylenediamine in the molar ratio of 55:45, 19.69 parts of di-n-butyl oxalate, 120 parts of o-dichlorobenzene and 4.48 parts of ethylene glycol (equivalent to 20% by weight of the final polymer) is heated to 160° C. under an atmosphere of nitrogen, the n-butanol formed in the reaction being removed by distillation. The mixture is then heated for a further 2 hours at 160° C. under an atmosphere of nitrogen, the mixture is then cooled, and the polyoxamide is filtered off, washed with methanol and dried.

The resulting polyoxamide has an inherent viscosity of 0.76.

When the reaction is carried out as described above but omitting the 4.48 parts of ethylene glycol, the polyoxamide has an inherent viscosity of only 0.54.

EXAMPLE 7

11.76 parts of a mixture of 2:2:4-trimethylhexamethylenediamine, 2:4:4 - trimethylhexamethylenediamine and hexamethylenediamine in the molar proportions 60:40:82 are added, with stirring to a suspension of 17.025 parts of di-n-butyloxalate and 0.02 part of zinc oxide in 120 parts (by volume) of ethylene glycol. The temperature of the reaction mixture rises spontaneously to 44° C. with formation of a solid. The mixture is then heated to 160° C., the butanol formed in the reaction being removed by distillation, and the mixture is then stirred for 2 hours at 160° C. under an atmosphere of nitrogen. The mixture is then cooled, and the precipitated polyoxamide is filtered off, washed with water and dried.

The inherent viscosity of the polyoxamide is 1.42.

When the 0.02 part of zinc oxide used in the above example is replaced by 0.02 part of lead monoxide (litharge) a polyoxamide having an inherent viscosity of 1.43 is obtained.

EXAMPLE 8

55 grams of the polyoxamide of Example 2 having an inherent viscosity of 1.056, in the form of a fine powder is placed, to a depth of 7 cms., in a cylindrical vessel of 6 cms. diameter, having a porous base, and compressed air is then passed through the base to give a fluid bed having a depth of approximately 12 cms.

A clean derusted mild steel plate 2.5 cms. x 7.5 cms. and thickness 0.15 cm. is heated to 350° C., and is then immediately transferred to the fluid bed of the polyoxamide where it is immersed for 1½ seconds. On removal from the fluidised bed, the polyoxamide particles adhering to the plate melt to give a uniform coating. This coating has a high degree of adhesion to the mild steel plate, and the coated plate has a high degree of resistance to corrosion.

EXAMPLE 9

A mixture of 20.1 parts of diethyl oxalate, 184 parts of ethylene glycol, 8.75 parts of a mixture of 2:2:4- and 2:4:4-trimethylhexamethylenediamine, 9.8 parts of hexamethylenediamine, 0.6 part of a 10% suspension of titanium dioxide in ethyleneglycol and 0.25 part of zinc oxide is gradually heated to 160° C. under an atmosphere of nitrogen, and this temperature is then maintained for 3 hours, the ethanol formed being removed by distillation. The mixture is cooled, the copolyoxamide is filtered off, then washed with water and is finally dried.

The inherent viscosity of the copolyoxamide is 1.13.

EXAMPLE 10

A mixture of 22.2 parts of decamethylenediamine, 26.11 parts of di-n-butyloxalate and 150 parts of ethylene glycol is gradually heated to 160° C. under an atmosphere of nitrogen and this temperature is maintained for a further hour, the n-butanol formed being removed by distillation. The resulting polyoxamide is then isolated by filtration.

The inherent viscosity of the polyoxamide is 0.92.

When the 22.2 parts of decamethylenediamine used in this example are replaced by 20.5 parts of nonamethylene diamine a polyoxamide of inherent viscosity of 0.87 is obtained.

EXAMPLE 11

A mixture of 9.2 parts of hexamethylenediamine, 19.9 parts of nonamethylenediamine, 23 parts of di-n-butyloxalate, 120 parts of ethylene glycol and 0.02 part of zinc oxide is stirred for 2 hours at 160° C. under an atmosphere of nitrogen, the n-butanol formed being removed by distillation. The mixture is then cooled, the copolyoxamide is filtered off, washed with water, and is then dried.

The inherent viscosity of the copolyoxamide is 1.174.

I claim:
1. A process for the manufacture of film- and fiber-forming polyoxamides and copolyoxamides which consists essentially of condensing together at least one aliphatic diamine containing from 2 to 12 carbon atoms and an oxalic acid di (lower alkyl) ester in an inert atmosphere and at a temperature of at least 140° C. in the presence of a glycol of the formula:

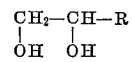

wherein R is selected from the class consisting of hydrogen, lower alkyl and hydroxymethyl.

2. Process as claimed in claim 1 wherein the glycol is ethylene glycol.

References Cited

UNITED STATES PATENTS

| | | | |
|---|---|---|---|
| 2,278,878 | 4/1942 | Hoff | 260—78 R |
| 2,977,340 | 3/1961 | Bruck | 260—78 R |
| 3,329,653 | 4/1967 | Beavers | 260—78 R |

HAROLD D. ANDERSON, Primary Examiner